(12) United States Patent
Chase

(10) Patent No.: US 12,024,039 B2
(45) Date of Patent: Jul. 2, 2024

(54) VEHICLE SELF-CENTERED CHARGING SYSTEM

(71) Applicant: Arnold Chase, West Hartford, CT (US)

(72) Inventor: Arnold Chase, West Hartford, CT (US)

(*) Notice: Subject to any disclaimer, the term of this patent is extended or adjusted under 35 U.S.C. 154(b) by 0 days.

(21) Appl. No.: 17/992,060

(22) Filed: Nov. 22, 2022

(65) Prior Publication Data
US 2023/0182598 A1    Jun. 15, 2023

Related U.S. Application Data

(60) Provisional application No. 63/265,066, filed on Dec. 7, 2021.

(51) Int. Cl.
*B60L 53/38* (2019.01)
*B60L 53/126* (2019.01)
(Continued)

(52) U.S. Cl.
CPC .............. *B60L 53/38* (2019.02); *B60L 53/126* (2019.02); *B60L 53/65* (2019.02); *H02J 50/10* (2016.02);
(Continued)

(58) Field of Classification Search
CPC .......... B60L 53/38; B60L 53/39; B60L 53/65; H02J 50/10; H02J 50/402
See application file for complete search history.

(56) References Cited

U.S. PATENT DOCUMENTS

| 645,576 A | 3/1900 | Tesla |
| 649,621 A | 5/1900 | Tesla |
| (Continued) | | |

FOREIGN PATENT DOCUMENTS

| CN | 103618350 A | 3/2014 |
| CN | 104810906 A | 7/2015 |
| (Continued) | | |

OTHER PUBLICATIONS

Use Cases for Wireless Charging Communication for Plug-in Electric Vehicles, Surface Vehicle Information Report, SAE International, Apr. 2021, J2836, pp. 1-20, retrieved https://www.sae.org/standards/content/J2836/6_202104 on Oct. 12, 2021.
(Continued)

*Primary Examiner* — Richard V Muralidar
(74) *Attorney, Agent, or Firm* — CANTOR COLBURN LLP

(57) ABSTRACT

A vehicle charging system having a ground assembly is provided. The system includes a first transmitting coil at a first position and is configured to move a first charging field location in a first direction and a second direction. A second transmitting coil is provided at a second position spaced apart from the first position, the second transmitting coil being configured to move a second charging field in the first direction and second direction. A controller is operably coupled to the first transmitting coil and the second transmitting coil. The controller is configured to selectively energize at least one of the first transmitting coil or the second transmitting coil in response to receiving a signal. The controller is further operable to move a position of the at least one of the first charging field and the second charging field in response to the signal.

8 Claims, 4 Drawing Sheets

(51) Int. Cl.
*B60L 53/65* (2019.01)
*H02J 50/10* (2016.01)
*H02J 50/40* (2016.01)
*H02J 50/80* (2016.01)
*H02J 50/90* (2016.01)

(52) U.S. Cl.
CPC ............ *H02J 50/402* (2020.01); *H02J 50/80* (2016.02); *H02J 50/90* (2016.02)

(56) References Cited

U.S. PATENT DOCUMENTS

| | | | |
|---|---|---|---|
| 787,412 | A | 4/1905 | Telsa |
| 1,119,732 | A | 12/1914 | Tesla |
| 2,133,494 | A | 10/1938 | Waters |
| 3,517,350 | A | 6/1970 | Beaver |
| 3,535,543 | A | 10/1970 | Dailey |
| 4,088,999 | A | 5/1978 | Fletcher et al. |
| 5,027,709 | A | 7/1991 | Slagle |
| 5,034,658 | A | 7/1991 | Hiering et al. |
| 5,070,293 | A | 12/1991 | Ishii et al. |
| 5,118,997 | A | 6/1992 | El-Hamamsy |
| 5,216,402 | A | 6/1993 | Carosa |
| 5,287,112 | A | 2/1994 | Schuermann |
| 5,341,083 | A | 8/1994 | Klontz et al. |
| 5,437,057 | A | 7/1995 | Richley et al. |
| 5,455,467 | A | 10/1995 | Young et al. |
| 5,493,691 | A | 2/1996 | Barrett |
| 5,528,113 | A | 6/1996 | Boys et al. |
| 5,550,452 | A | 8/1996 | Shirai et al. |
| 5,617,003 | A | 4/1997 | Odachi et al. |
| 5,821,731 | A | 10/1998 | Kuki et al. |
| 5,898,579 | A | 4/1999 | Boys et al. |
| 5,986,895 | A | 11/1999 | Stewart et al. |
| 5,999,308 | A | 12/1999 | Nelson et al. |
| 6,184,651 | B1 | 2/2001 | Fernandez et al. |
| 6,367,242 | B2 | 4/2002 | Uematsu et al. |
| 6,450,946 | B1 | 9/2002 | Forsell |
| 6,452,465 | B1 | 9/2002 | Brown et al. |
| 6,459,218 | B2 | 10/2002 | Boys et al. |
| 6,515,878 | B1 | 2/2003 | Meins et al. |
| 6,597,076 | B2 | 7/2003 | Scheible et al. |
| 6,664,770 | B1 | 12/2003 | Bartels |
| 6,673,250 | B2 | 1/2004 | Kuennen et al. |
| 6,731,071 | B2 | 5/2004 | Baarman |
| 6,749,119 | B2 | 6/2004 | Scheible et al. |
| 6,772,011 | B2 | 8/2004 | Polgin |
| 6,798,716 | B1 | 9/2004 | Charych |
| 6,806,649 | B2 | 10/2004 | Mollema et al. |
| 6,812,645 | B2 | 11/2004 | Baarman |
| 6,825,620 | B2 | 11/2004 | Kuennen et al. |
| 6,831,417 | B2 | 12/2004 | Baarman |
| 6,844,702 | B2 | 1/2005 | Giannopoulos et al. |
| 6,856,291 | B2 | 2/2005 | Mickle et al. |
| 6,906,495 | B2 | 6/2005 | Cheng et al. |
| 6,917,163 | B2 | 7/2005 | Baarman |
| 6,917,431 | B2 | 7/2005 | Soljacic et al. |
| 6,937,130 | B2 | 8/2005 | Scheible et al. |
| 6,960,968 | B2 | 11/2005 | Odendaal et al. |
| 6,975,198 | B2 | 12/2005 | Baarman et al. |
| 7,042,196 | B2 | 5/2006 | Ka-Lai et al. |
| 7,069,064 | B2 | 6/2006 | Gevorgian et al. |
| 7,116,200 | B2 | 10/2006 | Baarman et al. |
| 7,118,240 | B2 | 10/2006 | Baarman et al. |
| 8,729,859 | B2 | 5/2014 | Cook et al. |
| 9,132,739 | B2 | 9/2015 | Niizuma |
| 9,287,720 | B2 | 3/2016 | Kawamura |
| 9,333,870 | B2 | 5/2016 | Kume et al. |
| 9,381,878 | B2 | 7/2016 | Ichikawa |
| 9,409,491 | B2 | 8/2016 | Ichikawa et al. |
| 9,505,314 | B2 | 11/2016 | Widmer |
| 9,577,440 | B2 | 2/2017 | Partovi et al. |
| 9,577,466 | B2 | 2/2017 | Ku et al. |
| 9,581,997 | B1 | 2/2017 | Penilla et al. |
| 9,637,014 | B2 | 5/2017 | Schneider et al. |
| 9,643,505 | B2 | 5/2017 | Ichikawa et al. |
| 9,649,948 | B2 | 5/2017 | Bell et al. |
| 9,694,685 | B2 | 7/2017 | Ricci |
| 9,725,004 | B2 | 8/2017 | Asai et al. |
| 9,758,048 | B2 | 9/2017 | Ueda |
| 9,772,401 | B2 | 9/2017 | Widmer et al. |
| 9,780,574 | B2 | 10/2017 | Niizuma |
| 9,859,755 | B2 | 1/2018 | Beaver et al. |
| 9,873,346 | B2 | 1/2018 | Maekawa |
| 9,902,278 | B2 | 2/2018 | Maekawa |
| 9,908,425 | B2 | 3/2018 | Prokhorov |
| 9,925,883 | B2 | 3/2018 | Bell et al. |
| 9,969,287 | B2 | 5/2018 | Roberts et al. |
| 10,042,359 | B1 | 8/2018 | Konrardy et al. |
| 10,044,235 | B2 | 8/2018 | Takatsu et al. |
| 10,071,644 | B2 | 9/2018 | Wechsler et al. |
| 10,086,715 | B2 | 10/2018 | Lewis et al. |
| 10,122,211 | B2 | 11/2018 | Takatsu et al. |
| 10,236,727 | B2 | 3/2019 | Takatsu et al. |
| 10,293,700 | B2 * | 5/2019 | Javaid ..................... B60L 53/32 |
| 10,300,805 | B2 | 5/2019 | Halker et al. |
| 10,343,532 | B2 | 7/2019 | Yuasa |
| 10,351,006 | B2 | 7/2019 | Annoije et al. |
| 10,377,254 | B2 * | 8/2019 | Niizuma ................. H01F 38/14 |
| 10,427,549 | B2 | 10/2019 | Yang et al. |
| 10,457,158 | B2 | 10/2019 | Namou et al. |
| 10,464,432 | B2 | 11/2019 | Katanoda |
| 10,562,396 | B2 | 2/2020 | Tokura |
| 10,668,829 | B2 | 6/2020 | Von Novak, III et al. |
| 10,688,875 | B2 | 6/2020 | Iwai et al. |
| 10,766,373 | B2 | 9/2020 | Nishio et al. |
| 10,850,634 | B2 | 12/2020 | Wang et al. |
| 10,988,042 | B1 | 4/2021 | Chase |
| 10,992,181 | B2 | 4/2021 | Shijo et al. |
| 11,005,310 | B2 | 5/2021 | Konschak et al. |
| 11,186,186 | B2 * | 11/2021 | Hase ....................... B60L 53/12 |
| 2009/0096413 | A1 | 4/2009 | Partovi et al. |
| 2010/0017249 | A1 | 1/2010 | Fincham et al. |
| 2012/0319644 | A1 | 12/2012 | Hu et al. |
| 2014/0125144 | A1 | 5/2014 | Nakamura et al. |
| 2014/0232336 | A1 | 8/2014 | Kepka |
| 2014/0252874 | A1 | 9/2014 | Niizuma |
| 2015/0091511 | A1 | 4/2015 | Ichikawa |
| 2015/0145472 | A1 | 5/2015 | Kees et al. |
| 2015/0170814 | A1 | 6/2015 | Blum et al. |
| 2016/0033288 | A1 * | 2/2016 | Ueda ....................... B60L 53/37 |
| | | | 701/302 |
| 2016/0052406 | A1 | 2/2016 | Ohashi et al. |
| 2016/0089987 | A1 | 3/2016 | Ichikawa et al. |
| 2016/0325631 | A1 | 11/2016 | Lannoije et al. |
| 2017/0259682 | A1 | 9/2017 | Oettle et al. |
| 2018/0178666 | A1 * | 6/2018 | Javaid ..................... H02J 50/90 |
| 2018/0264963 | A1 | 9/2018 | Dudar |
| 2020/0180447 | A1 | 6/2020 | Nishimura et al. |
| 2020/0251929 | A1 | 8/2020 | Partovi |
| 2020/0269714 | A1 | 8/2020 | Leibetseder et al. |
| 2021/0061117 | A1 | 3/2021 | Singuru et al. |
| 2021/0197677 | A1 | 7/2021 | Terada |
| 2021/0316626 | A1 | 10/2021 | Chase |
| 2022/0089053 | A1 | 3/2022 | Chase |

FOREIGN PATENT DOCUMENTS

| | | |
|---|---|---|
| CN | 106671811 A | 5/2017 |
| CN | 107199897 A | 9/2017 |
| CN | 107813726 A | 3/2018 |
| CN | 108177546 A | 6/2018 |
| CN | 108437825 A | 8/2018 |
| CN | 108437838 A | 8/2018 |
| CN | 108819788 A | 11/2018 |
| CN | 109004698 A | 12/2018 |
| CN | 109664778 A | 4/2019 |
| CN | 110027416 A | 7/2019 |
| CN | 110053499 A | 7/2019 |
| CN | 110126649 A | 8/2019 |
| CN | 110435450 A | 11/2019 |
| EP | 1521206 A2 | 4/2005 |
| EP | 3315351 A2 | 5/2018 |
| KR | 2127167 B1 | 6/2020 |

(56) References Cited

FOREIGN PATENT DOCUMENTS

| WO | 2010090333 A1 | 8/2010 |
| --- | --- | --- |
| WO | 2010098412 A1 | 9/2010 |
| WO | 2012169197 A1 | 12/2012 |
| WO | 2013145581 A1 | 10/2013 |
| WO | 2015158589 A1 | 10/2015 |
| WO | 2018196385 A1 | 11/2018 |
| WO | 2019053676 A1 | 3/2019 |
| WO | 2019082076 A1 | 5/2019 |
| WO | 2019097900 A1 | 5/2019 |
| WO | 2020078982 A1 | 4/2020 |
| WO | 2021057706 A1 | 4/2021 |

OTHER PUBLICATIONS

Use Cases for Wireless Charging Communication for Plug-in Electric Vehicles, Surface Vehicle Information Report, SAE International, May 2013, J2836, pp. 1-20, retrieved from internet http://www.sae.org/technical/standards/J2836/6_201305 on Oct. 12, 2021.

Wireless Power Transfer for Light-Duty Plug-In/ Electric Vehicles and Alignment Methodology, Surface Vehicle Information Report, SAE International, May 2016, J2954, pp. 1-115, retrieved from internet http://www.sae.org/technical/standards/J2954_201605 on Oct. 12, 2021.

Wireless Power Transfer for Light-Duty Plug-In/Electric Vehicles and Alignment Methodology, Surface Vehicle Information Report, SAE International, Nov. 2017, J2954, pp. 1-150, retrieved from internet http://standards.sae.org/J2954_201711 on Oct. 12, 2021.

Wireless Power Transfer for Light-Duty Plug-in/Electric Vehicles and Alignment Methodology, Surface Vehicle Recommended Practice, SAE International, Apr. 2019, J2954, pp. 1-172, retrieved http://standards.sae.org/J2954_201904 on Oct. 12, 2021.

Wireless Power Transfer for Light-Duty Plug-in/Electric Vehicles and Alignment Methodology, Surface Vehicle Standard, SAE International, Oct. 2020, J2954, pp. 1-194, retrieved from internet https://www.sae.org/standards/content/J2954_202010 on Oct. 12, 2021.

International Search Report of the International Searching Authority (ISA/US) mailed Mar. 8, 2023 for International Application No. PCT/US2022/051924 filed Dec. 6, 2022, 2 pages.

Written Opinion of the International Searching Authority (ISA/US) mailed Mar. 8, 2023 for International Application No. PCT/US2022/051924 filed Dec. 6, 2022, 7 pages.

\* cited by examiner

VEHICLE SELF-CENTERED CHARGING SYSTEM

CROSS-REFERENCE TO RELATED APPLICATIONS

The present application is related to U.S. patent application Ser. No. 17/240,121 filed on Apr. 26, 2021, which is a continuation application of U.S. patent application Ser. No. 16/601,685 filed Oct. 15, 2019, now U.S. Pat. No. 10,988,042, which claims the benefit of U.S. Provisional Patent Application No. 62/744,835, filed on Oct. 12, 2018, each of which is hereby incorporated by reference in its entirety.

BACKGROUND OF THE DISCLOSURE

The subject matter disclosed herein relates to a charging system for vehicles, and in particular to a charging system that inductively charges a vehicle battery.

While wireless charging systems that employ passive physical centering methods such as the use of guidance rails, etc. may be successful when used in conjunction with traditional "fixed" parking spaces such as are found with "pull in/pull out" indoor parking garage spaces, it is envisioned that embodiments of this disclosure will expand to be used with outdoor on-street parallel or angled parking spaces that are typically accessed by parallel parking methods. With such embodiments, any Ground Assembly (GA) equipment that vertically protrudes above such parking spaces creates pedestrian and/or vehicular navigation impediments, as well as being obstacles to snow plowing or other road maintenance.

While it is physically possible to install GA equipment that is capable of moving in three axis directions in outdoor locations, from a practical standpoint such side of roadway embodiments risks freezing in place, being damaged by snow plow blades, snow-melt chemicals, sand, etc. Due to these roadway environmental challenges, X/Y axis movements of a GA coils is best accomplished by a dynamically changeable Field Pattern mechanism which does not require any physical movement of X/Y axis elements in order to properly function. Similarly, Z-axis alignment of a GA coil relative to a Vehicle Assembly (VA) coil is best accomplished by the movement of the VA coil only.

Accordingly while existing charging systems are suitable for their intended purposes the need for improvement remains, particularly in providing a charging system having the features described herein.

BRIEF DESCRIPTION OF THE DISCLOSURE

According to one aspect of the disclosure a self-centered charging system (SCCS) is provided. The SCCS allows for the automatic adjustment of the gap between a charging coil and a receiving coil to within a predetermined distance. In further embodiments, or in the alternative the automatic adjustment further includes changing a side to side and/or front to back positioning of one of the receiving coil or charging coil relative to the other of the receiving coil or charging coil.

According to another aspect of the disclosure a coordinated sequential charging system (CSCS) is provided. The CSCS allows for the charging of vehicles waiting in a queue or line by providing a series of charging positions that vehicles within the line that the vehicles sequentially move to and receive additional charging while proceeding in the line.

According to another aspect of the disclosure, a vehicle charging system having a ground assembly is provided. The system includes a first transmitting coil at a first position and is configured to move a first charging field location in a first direction and a second direction. A second transmitting coil is provided at a second position spaced apart from the first position, the second transmitting coil being configured to move a second charging field in the first direction and second direction. A controller is operably coupled to the first transmitting coil and the second transmitting coil. The controller is configured to selectively energize at least one of the first transmitting coil or the second transmitting coil in response to receiving a signal. The controller is further operable to move a position of the at least one of the first charging field and the second charging field in response to the signal.

According to another aspect of this disclosure, a vehicle charging system is provided. The system includes a first plurality of vehicle charging ground assemblies each having a first transmitting coil. Each of the transmitting coils is configured to move in a first direction and a second direction to change a position of an associated charging field. Each of the first transmitting coils of the first plurality of vehicle charging ground assemblies is spaced apart a first distance. The system includes a second plurality of vehicle charging ground assemblies each having a second transmitting coil. Each of the transmitting coils being configured to move in the first direction and the second direction to change a position of an associated charging field. Each of the second transmitting coils of the second plurality of vehicle charging ground assemblies is spaced apart a second distance. The system further includes a controller operably coupled to the first plurality of vehicle charging ground assemblies and the second plurality of vehicle charging ground assemblies to selectively energize the first transmitting coils and second transmitting coils in response to a first signal.

another vehicle charging system is provided. The system including a first transmitting coil at a first position and configured to move a first charging field location in a first direction and a second direction. A second transmitting coil is positioned at a second position spaced apart from the first position. The second transmitting coil is configured to move a second charging field in the first direction and second direction. A first vehicle assembly is provided having first receiving coil coupled to a vehicle. The first vehicle assembly having a mechanism configured to change a vertical height of the first receiving coil. The first vehicle assembly also having a sensor configured to determine a distance from a surface of the first receiving coil to a top surface of the first transmitting coil or second transmitting coil. The system also having a first controller operably coupled to the first transmitting coil and the second transmitting coil. The controller being configured to selectively energize at least one of the first transmitting coil or the second transmitting coil in response to receiving a first signal. The controller being further operable to move a position of the at least one of the first charging field and the second charging field in response to the first signal.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION OF THE DISCLOSURE

It should be appreciated that vehicles may use on-street parking charging spaces and are not able to consistently center their X/Y parked position (e.g. front to back and side to side) above a parking space charging coil for a number of reasons, so in order to properly operate an EV charging system under this setting a dynamically reconfigurable charging field is desired. The Self-Centering Charging System (SCCS) 20 of the present disclosure provides advantages in handling this very situation without needing to have any physically relocatable ground-mounted equipment with its attendant problems.

Figure 1:
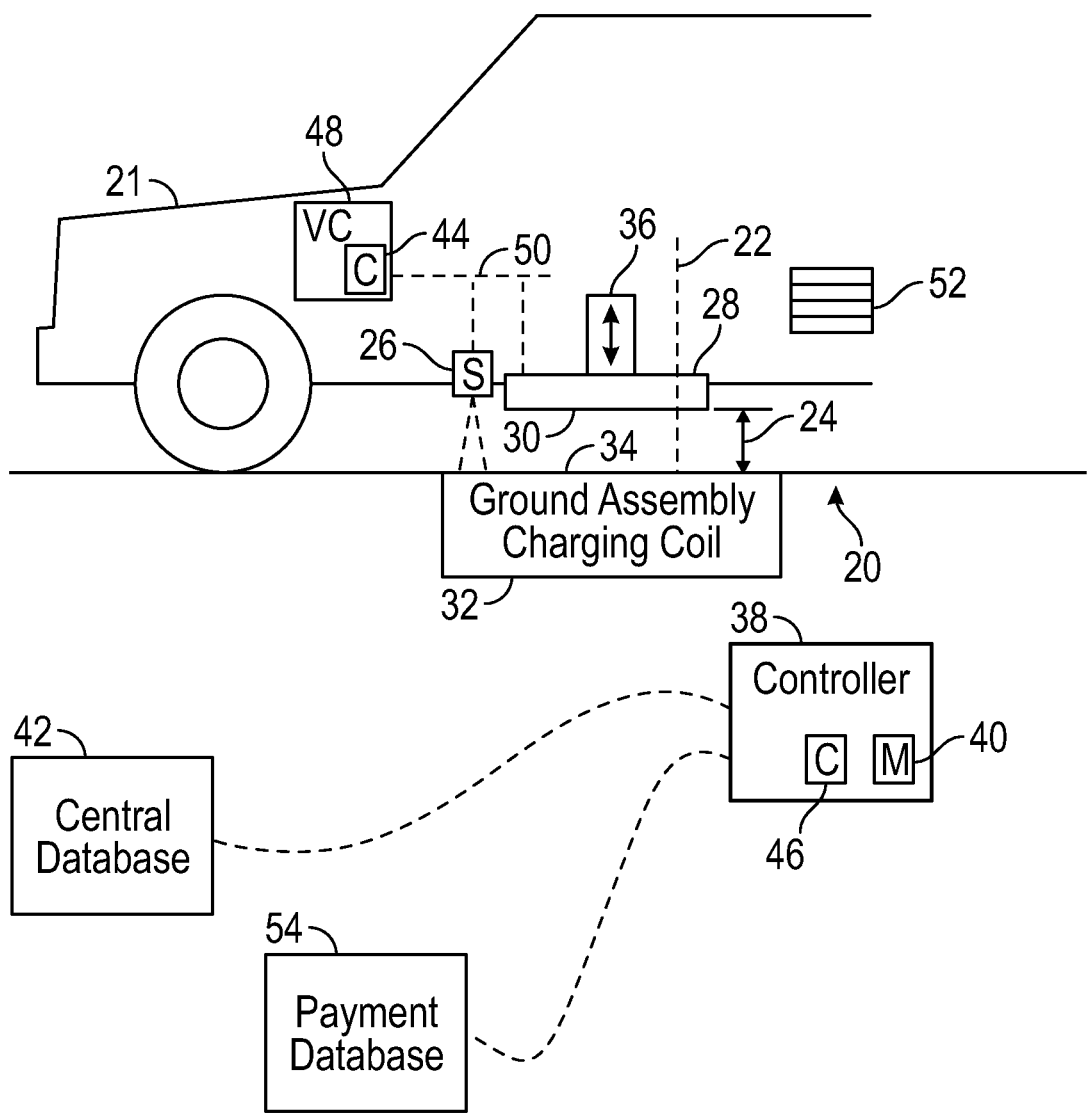
FIG. 1 is schematic illustration of a vehicle and self-centered charging system in accordance with an embodiment.

Referring to FIG. 1, in an embodiment for the Z-axis 22 (e.g. the vertical axis perpendicular to the ground), both energy transfer physics as well as the proposed SAE International specifications, such as proposed standard J2954 for example, call for a defined "coil to coil" gap 24 separation value range. In places such as the previously mentioned outdoor public parking and charging spaces that support a multitude of vehicles and vehicle types, each potentially possessing different undercarriage heights, different tire and wheel diameters, as well as potentially facing varying amounts of snow and/or ice coverings, etc., the cumulative result of these factors results in a wide range in differences of the distance between the VA to GA (e.g. the coil to coil gap 24)), or that may need to be compensated for in a vehicle to vehicle basis in order to consistently be able to meet the Z-axis charging coil separation guidelines provided by industry standards, such as the aforementioned proposed SAE J2954 standard for example. In addition to the aforementioned separation guidelines (e.g. the gap between the transmitting and receiving coil), additional technical parameters may be defined for different vehicles. These technical parameters may include, but are not limited to: maximum and minimum voltages, maximum and minimum current levels, energy transfer rates, field frequency maximum storage capacities, component temperatures, or a combination of the foregoing for example.

A exemplary embodiment used with the present disclosure employs ultrasonic range-finding sensor assembly(s) 26 that continuously provide a measurement between a vehicle's power receiving coil 28 lower surface 30 and a top surface 34 of the 1's power transmitting coil 32. An operative connection between said range-finding sensor assembly(s) 26 (which is a part of the VA) and a vehicle's Z-axis lowering mechanism 36 provides the charging system controller 38 with a method for dynamically adjusting the GA to VA separation distance value 24. This value initially adjusts to a desired position and stays within an SAE or other standard usage guidelines through the charging duration. This aspect of a dynamic separation system automatically compensates for factors such as vehicles that are at non-standard height using, for instance, snow tires, tire chains, having tires over or under inflated which changes the ride height and thus the resultant VA height, ice and snow buildup under the vehicle's tires, etc. These height differences would be automatically detected by the ultrasonic sensor assembly(s) and would essentially "fine-tune" and optimize the receiving coil 28 location relative to the charging field that SCCS 20 provides. It should be noted that any difference offset between the actual ultrasonic sensor 26 location(s) and the bottom surface of the VA receiving coil 30 would be pre-compensated for in the measurement calculations.

Further, as discussed above, the inherent differences between various vehicles within a vehicle type, as well as different vehicle categories that may park upon outdoor spaces call for not only dynamically normalizing the X/Y center of a charging field location, but also ensuring that the charging field pattern and shape of the charging field, as well as the electrical characteristics of the charging field is configured or optimized for a corresponding receiving charging coil 28 VA that is present at any given time. The differences between the various VA's that are present with different types of vehicles e.g., passenger cars, heavy-duty commercial trucks, etc. presented a constant challenge to earlier passenger-vehicle only wireless charging proposals.

SCCS 20 can seamlessly adapt to and accommodate all of the various industry specifications and differences desired for wirelessly charging a multitude of vehicle types. By having different types of vehicles make an initial transmission to a charger after the vehicle recognizes a SCCS compatible charging unit, the charger may seamlessly, dynamically, and automatically reconfigure various electrical and/or physical parameters to provide compatibility between the charging system and a vehicle and/or a vehicle type. The data content of this initial transmission from the VA to the controller 38 would contain the vehicle and the specific charging system characteristics which are individualized and specific to the vehicle desiring a charge from a SCCS equipped charger and the SCCS charger controller 38. In an embodiment, at a minimum, the data transmitted from a vehicle 21 to a charger before a charging session commenced may include the Vehicle Identification Number (VIN). The VIN inherently contains configuration information about the vehicle that is requesting a charge, including the year, country, and factory of manufacture; the make and model; and the serial number of the vehicle.

Just as various makes and models of internal combustion vehicles may be ordered and equipped with various engine choices (with each engine choice having differing physical requirement characteristics such as different engine oil capacities), electric vehicles (EV) already may be equipped with various voltage and/or capacity power packs. It should be appreciated that in the future different other options may also be available from vehicle manufacturers that could impact the charging process. Further to the transmitted VIN, additional vehicle-specific information such as this may be appended to the transmitted VIN essentially creating a "VIN+" which may include, but not be limited to, information as to the size and voltage of the installed battery pack(s), the target amount and maximum instantaneous charging current allowed for the specific vehicle configuration, the "not to exceed" total charging current amounts per a given time-frame, the maximum charging acceptance rate that the vehicle can safely handle, the maximum charging voltage the vehicle can accept, etc.

Because of this extensive amount of vehicle information that can be sent from a SCCS-equipped vehicle 21 to a SCCS charging system 20, this inherently allows for a wider range of vehicle types to be accommodated by a SCCS 20 such as Heavy-Duty (e.g. Class 8) vehicles, construction and/or off-road vehicles, utility vehicles, etc.

Optionally, each vehicle 21 during the pendency of a charging session would also have the capability to contemporaneous transmit to the charger and charging system additional charging-session relevant information/data such as battery temperatures (internal, external, and ambient), etc. to signal to the charging controller conditions such as an abnormal rise in battery temperature(s) beyond the expected thermal range for that capacity power pack in order to limit the charger output so as to prevent problems such as thermal runaway, etc. from occurring. In some embodiments, with the increasing rate of voltages and charging current being proposed, such session-relevant information becomes increasingly desired for each charging session.

In an embodiment, each charging controller 38 may be equipped with a non-volatile memory 40 which would have a database of all, or substantially all, of the known makes and models of electric vehicles in order to automatically and dynamically configure the location, size, and charging field pattern generated by the charging coil 32 for each vehicle 21 that presents itself to a SCCS 20 charging location. While said database may be configured to be manually amended and updated, optionally the controller would have connectivity to a computer network (e.g. the "Internet") which would periodically check with a central database 42 in order to automatically amend and/or add the latest new vehicle models and their physical configuration information into the resident database of each SCCS charger 20, as well as newly released charging protocols commensurate with new battery chemistries and/or embodiments which would allow the charger 20 to accommodate evolving charging needs It should be noted that in an embodiment, the information exchange between a vehicle 21 and charging system 20 equipped with SCCS technology is bi-directional, and may take place either "in-band" by directly modulating charging coils 28, 32, or "out-of-band" utilizing various short-distance radio frequency (RF) communications methods such as Bluetooth™, etc. via communication circuits 44, 46 in the vehicle 21 and controller 38 respectively.

The controller 48 of an electric vehicle possessing a SCCS wireless charging capability that may inhibit the physical movement of an EV 21 being charged/located above a charging coil 32 that also possesses such technology (SCCS) through one of several methods. In a first method, the onboard-vehicle controller 48 which is operatively connected to a Controller Area Network Bus (CAN Bus) or other electronic "backbone" network 50 would be utilized to prevent the vehicle propulsion motor(s) from energizing if the vehicle 21 possessed a movable Z-axis receiving coil 28 and said coil was not in the fully retracted position. Such vehicle 21 movement attempt may also automatically cause the Z-axis receiving coil(s) 28 to move to the fully retracted position after which the vehicle 21 movement lockout functionality would terminate and allow subsequent vehicular movement. The movement of the receiving coil(s) 28 may occur in real time within a short predefined period of time of the detection of the vehicle 21 movement (e.g. instantaneously).

In a second method, the onboard-vehicle controller 48 which is operatively connected to a Controller Area Network Bus (CAN Bus) 50 or other electronic "backbone" network would prevent the vehicle propulsion motor(s) from energizing if the vehicle 21 sensed that a charging operation was presently underway (e.g. via the detection of positive current flow into a vehicle's power pack 52 from the receiving coil(s) 28). Such vehicle movement attempt may automatically cause a receiving coil(s) to instantly move to the fully retracted position after which the vehicle movement lockout functionality would terminate and allow subsequent vehicular movement.

In an embodiment, with regard to the payment information and method for a charging session, which is typically directly passed from a vehicle 21 to the charging equipment 20 either before or after a charging session, such sensitive payment information (such as credit card information) may not be transmitted from a vehicle 21 to a charger with SCCS, but instead the charging equipment may utilize the previously transmitted VIN or "VIN+" information to allow a secure central billing facility 54 to reference the payment method for the charging session. Not only is this method far more secure (as sensitive payment information is NOT locally transmitted from a vehicle 21 and potentially intercepted by undesired third-parties, but it also inherently allows the use of direct bank payments, Debit cards, or any other form of payment in use at the time to be securely utilized as well. As a security measure a checksum system or other data verification information would be sent from the vehicle 21 to the charging equipment and/or central database 42 to prevent spoofing/imitating of the VIN, etc.

It should be appreciated that the SCCS 20 includes the operative connectivity between a charger controller 38 and a vehicle 21. This connectivity alerts (e.g. transmits a signal to) a vehicle 21 that the vehicle 21 is moving toward or is stopped over a charger which allows for a self-initiated charging session. Further, this outside "situation awareness" additionally transmits data to (e.g. informs) a vehicle 21 that there may be power available to operate various vehicle accessories such as HVAC without having to draw upon the vehicle's power pack(s) 52 regardless of whether the vehicle 21 was actually being charged or not.

In an embodiment, the SCCS 20 signals to an operatively connected vehicle 21 the "type" and locational context of the charger, e.g. "outdoor/fixed parking space public charger", "indoor private (home) charger", etc. This brings a new level of locational context logic to a vehicle, which advantageously allows the vehicle to appropriately enable various contextual auxiliary functions.

As an example, if the charger 20 indicated to the vehicle 21 that the vehicle 21 was parked at an indoor charging space which was positioned in an indoor location (e.g., in an enclosed parking garage), then only functions such as interior heating or cooling would be allowed to be enabled.

If, however, the charger 20 indicated to the vehicle 21 that it was parked over a public, outdoor charging space, then an additional subset of vehicle functions would also be allowed. In such a situation, the vehicle's embedded logic and sensors such as sensors for outside temperature, precipitation, etc. that may be already present in the vehicle 21 could be autonomously used for additional vehicle functionality.

Once a vehicle's logic is contextually aware of its location and weather context such as being outside during the day parked over a public street side charging space under below freezing ambient temperatures with precipitation falling, then the vehicle's windshield (and window defrosters), windshield wipers, cabin heater, heated seats, heated steering wheel, etc. could automatically or periodically function (without depleting the vehicle's power pack(s)) thus allowing a driver to return to their vehicle 21 with having to clean snow and ice off of the windshield, etc. In a similar fashion, during summer conditions the inside and outside temperature sensors of the vehicle can automatically initiate additional contextual functions such as energizing seat coolers, dimming electrochromic windows and windshield, etc.

Since the information exchange may be conducted by modulating the VA 28 (and received by the GA32) or modulating the GA 32 and received by the VA 28, this provides a highly directional and focused local communications path that provides superior path discrimination in situations where multiple charging pads may be in close proximity, while also inherently providing isolation from third-party "eavesdroppers" that may attempt to intercept such communications.

The previously disclosed VIN/VIN+ identification information may also be directed to other antennas and/or transmitters for other uses such as garage or other area access. With autonomous vehicles, the need still remains for authorities to determine registration information in the course of numerous situations such as vehicle tracking, vehicle theft determination, etc. With AV's, the traditional physical "License and Registration" requests are not possible, so a "non-contact" method of determining this information is needed and is able to be fulfilled by the use of SCSC through the previously mentioned secondary antennas and/or transmitters.

Figure 2:
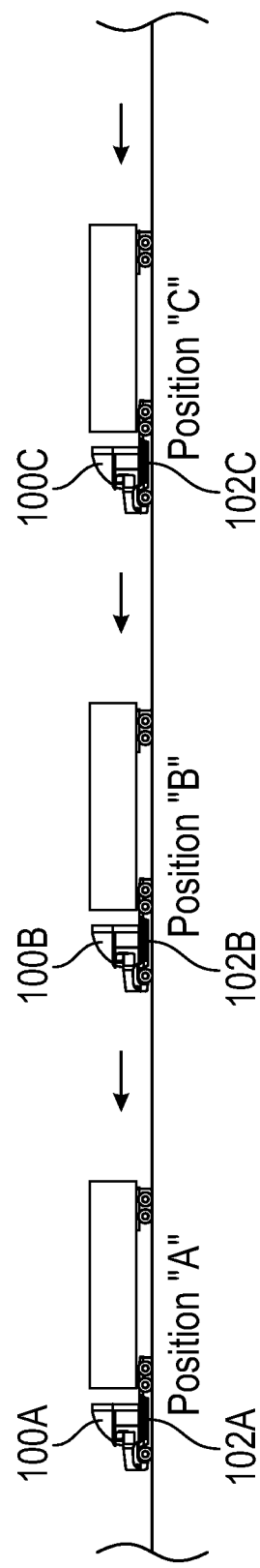
FIG. 2 is a schematic side view illustration of a coordinated sequential charging system in accordance with an embodiment.
Figure 3:
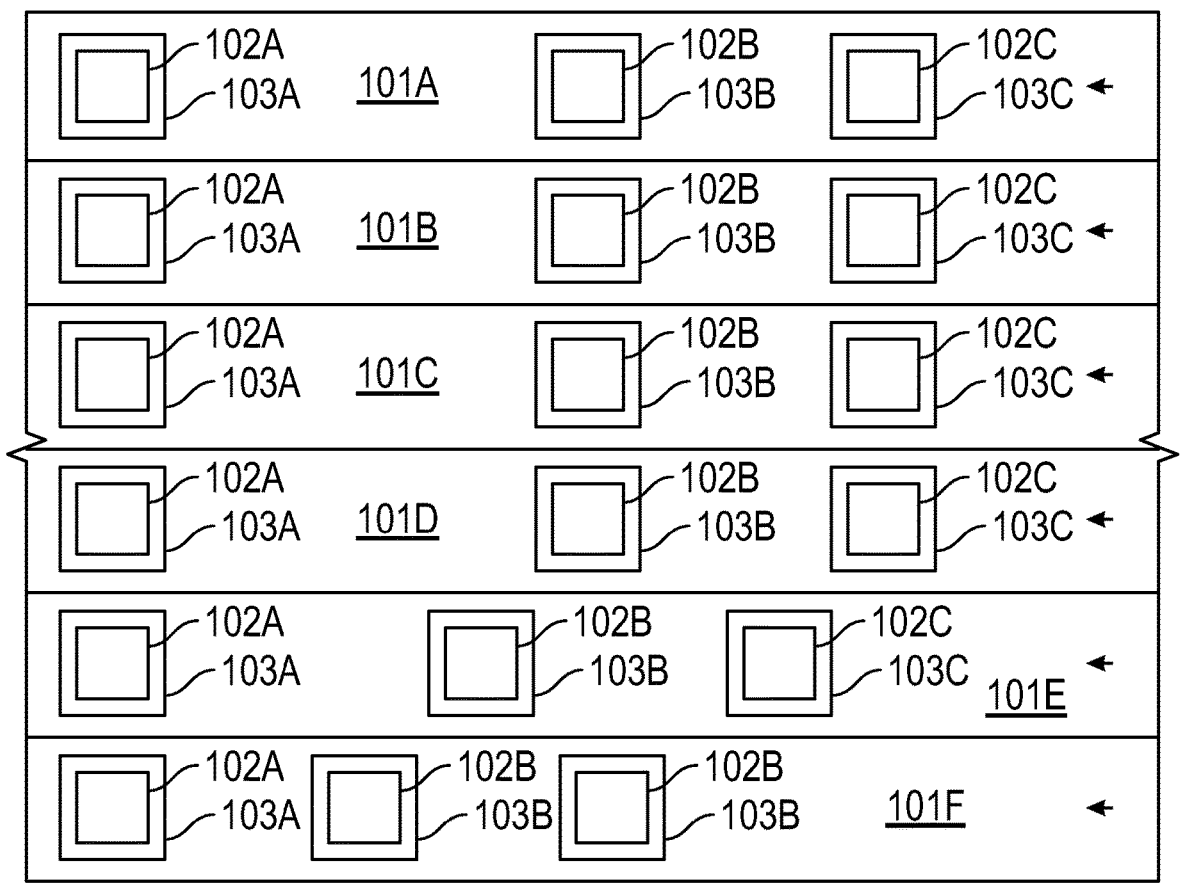
FIG. 3 is a schematic plan view illustration of the coordinated sequential charging system of FIG. 2.
Figure 4:
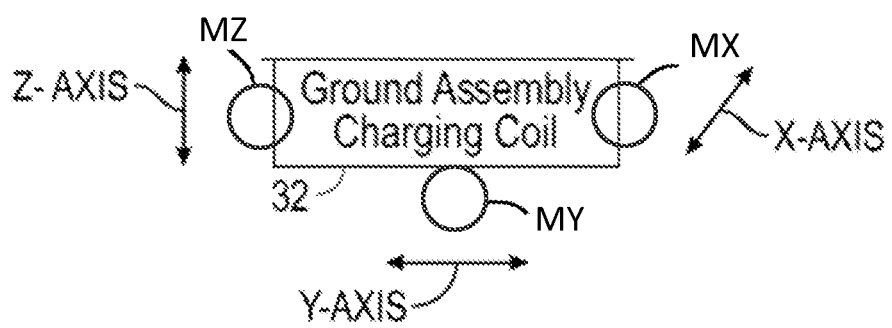
FIG. 4 is a schematic view of a ground assembly charging coil according to one or more embodiments.

Referring now to FIG. 2 and FIG. 3, a further embodiment of a SCCS is shown that would utilize parallel driving or parking lane(s) 101A-101F containing line-ups of vehicles 100A, 100B, 100C, etc. which would allow a plethora of vehicles within a common lane(s) to be simultaneously sequentially charged while still allowing each lane of vehicles to make forward progress in a coordinated manner.

Such embodiment would be ideal for locations that regularly cope with concentrated lines of slow-moving vehicles such as found at overcrowded border crossings, freight inspection facilities, port freight pickup areas, toll booths, highway or tunnel entrances, or other locations that tend to be highly congested.

Such locations and settings typically comprise one or more lines of slow moving and/or regularly stopped while waiting to move vehicles. Conventionally, as leading vehicles that are directly in front of other vehicles creep or slowly move forward, the following vehicles attempt to roughly match the leading vehicle's distance movement (i.e., "creep forward a short distance and then stop"). This manner of movement, while common, is generally considered to be wasteful and does not allow for simultaneous ancillary benefits such as charging to occur while waiting in line.

Rather than a line of vehicles randomly and independently "creeping" along in order to maintain a rough proximation to a vehicle in front of a subject vehicle, in this embodiment each vehicle such as a tractor-trailer that is in a line-up upon sensing that the vehicle in front of the subject vehicle had moved to a new preset marked position, the subject vehicle would then move forward to now occupy the newly vacated space. Most significantly, each of the designated stopping "spaces" would contain a SCCS charging coil 102A-102C so vehicles in a lane essentially would hop from one charging pad to another in sequential fashion while still enjoying technical advantage/effect in receiving a majority of the overall available charging opportunity(s) that would otherwise not be possible.

The overall SCCS would allow for each vehicle to accept or reject each individual charging opportunity. The result of this embodiment would allow an electric vehicle (EV) that would otherwise be spending unproductive time in making small random moves to instead productively and automatically sequentially recharge their power pack(s) at each defined stopping location, thus avoiding the need to waste future additional time to purposefully go to a charging location to recharge.

Just as many individual traffic lanes are currently reserved and limited to certain types of vehicles or operations, this embodiment may also provide for certain lanes 101 to be reserved for various types of vehicles such as cars. With this vehicular differentiation, the spacing of GA's 102A-102C and charging locations 103A-103C may be modified to align with the different total lengths of vehicles that are allowed in that lane, thus increasing the lane density without taking away from the overall concept. Any vehicle that is shorter in total length than the maximum total length limit for each lane would still be compatible with the SCCS equipment as a shorter-length vehicle would merely leave additional spacing between the vehicles in a line. There may also be lanes dedicated to just those vehicles that possess SCCS charging equipment, as well as "conventional" lanes dedicated to vehicles without charging equipment or non-compatible vehicles.

While the previous discussion focused on a single lane, this is for example purposes and claims should not be limited to a single lane, but rather in other embodiments it is envisioned that multiple "side by side" lanes 101A-101F and arrangements of charging coil assemblies 102A-102C would easily coexist to allow simultaneous multiple charging to occur among the various lanes of traffic. In other words, it should be appreciated that each of the sequential SCCS charging coils 102A-102C of lanes 101A-101F generates a charging field that cooperates with a coil in the vehicle at a particular charging pad to transfer energy to the vehicle energy source (e.g. its batteries 52). In an embodiment, each of the first charging fields generated by the GA's of charging coils 102A-102C of lane 101A may be selectively energized, while the second charging fields generated by the GA's of charging coils 102A-102C of adjacent lane 101B (and other lanes 101C-101F) may be selectively and independently energized based on the presence of vehicles in that lane.

By utilizing the automatic charging opportunity feature of SCCS along with a successive sequential charging configuration, otherwise wasted time may be used to conduct sequential charging while vehicles are periodically moving from charging location to charging location, thus reducing the need for subsequent conventional longer duration charging. At regularly spaced intervals within each traffic lane 101A-101F there would be successively spaced areas of wireless charging pads (GA's) 102A-101F. The spacing between each successive wireless charging pad 102 would be determined by the maximum length of vehicle(s) that would be expected to utilize that lane roughly corresponding to the combined length of a tractor and trailer (with a small buffer). As an example, in lanes 101A-101D that would service "Tractor-Trailer" setups that may have a combined total length of approximately 65 feet (19.8 meters), the progressive linear strip spacing for that lane would be, for example, 75 feet apart, thus the charging pad opportunity location would repeat every 75 feet (22.9 meters). Lanes that may be designated, for example, for smaller trucks 101E, the spacing between each successive wireless charging pads 102 would be reduced from the spacing in 101A-101D. Lanes that may be designated, for example, for passenger cars 101F the spacing between each successive wireless charging pads 102 would be reduced further.

The location within each lane 101A-101F for each stopping point containing a GA 102A-102C would be clearly marked on the roadway by lane markings, as well as other means such as overhead structures similar to existing overhead toll gantries that would contain overhead signs to indicate a proximate charging position. Overhead multi-color signals (e.g. lights) may additionally be used to indicate to a driver at each charging position when they are generally properly positioned, with the SCCS optimizing the charger alignment at each charging location as is done with other embodiments, as well as indicating when it is time for a vehicle to advance to the next charging position.

Instead of vehicles successively starting and stopping randomly at short, frequent intervals only to have moved a few feet, in one embodiment, the system would coordinate the starting and stopping of successive vehicles 100 within each lane 101A-101F between charging locations 102A-102C so as to not only reduce the number of star/stop operations needed (which is not only more energy efficient as well as prolonging the vehicle's brake life, as well as being physically less tiring for a driver), but more importantly this movement coordination also allows for each vehicle to have more meaningful "linger" times that may be utilized for charging. This may also be accomplished by communications between the SCCS and the EV. The EV may automatically advance to the next location when a signal is received, or may provide a visual or audio indicator to the EV driver notifying them to advance to the next location. This is especially desirable for HVAC and refrigerated trailer operation which is expected to be converting along with passenger vehicles to all-electric operation in the near future. The conversion to electric operation precludes the need for diesel powered auxiliary power units (APU's) to provide on-route refrigeration. The ability to recharge such a refrigerated vehicle's battery packs while the vehicle is essentially stationary is highly desirable and prevents unnecessary further drain from the vehicle's power pack by the refrigeration equipment.

In the event that traffic is not sufficiently congested to require the need for frequent start/stop operations, then the overhead signaling would stay, for instance, continuously green to preclude charging opportunities.

While the previous discussion was focused on "driven" vehicles, the SCCS is equally suited for Autonomous Vehicle operation, either in lanes 101A-101F that have mixed driven/autonomous vehicles, or in lanes 101A-101F which are reserved for autonomous vehicle (only) operation, in which case there may not be a need for certain visual signaling but instead there would be enhanced infrastructure to vehicle communication.

The SCCS 20 may further include an x-axis motor MX, a y-axis motor MY and a z-axis motor MZ each operatively connected to the charging controller 38. The SCCS 20, shown in FIG. 1, is configured to operate one or more of the motors MX, MY, MZ to physically move the ground assembly charging coil 32 to optimize the location of the ground assembly charging coil 32 relative to the location of the receiving coil 28 of the vehicle 21 in order to physically maximize and/or optimize energy transfer between the receiving coil 28 and the ground assembly charging coil 32. Thus, the ground assembly charging coil 32 may be moved in one or more axes (X, Y, Z) relative to the receiving coil 28 attached to the underside of the vehicle 21. The ground assembly charging coil 32 may be moved back and forth along all three axes sequentially, or substantially simultaneously, to find a point on each axis of movement that delivers the maximum or optimum amount of charging current to the vehicle 21. Although shown with a single motor for each axis of movement, in some embodiments, there may be more than one motor for each axis (X, Y, Z). Alternatively, one or more of the axes (X, Y, Z) may not include a motor MX, MY, MZ, in which case the ground assembly charging coil 36 may be moved in one or two degrees of freedom as opposed to three.

In another embodiment, a vehicle charging system having a ground assembly is provided. The system includes a first transmitting coil at a first position and is configured to move a first charging field location in a first direction and a second direction. A second transmitting coil is provided at a second position spaced apart from the first position, the second transmitting coil being configured to move a second charging field in the first direction and second direction. A controller is operably coupled to the first transmitting coil and the second transmitting coil. The controller is configured to selectively energize at least one of the first transmitting coil or the second transmitting coil in response to receiving a signal. The controller is further operable to move a position of the at least one of the first charging field and the second charging field in response to the signal.

In this or other embodiments, the controller is further configured to energize the first transmitting coil in response to a vehicle moving towards the first position.

In this or other embodiments, the controller is further configure to energize the second transmitting coil in response to the vehicle moving from the first position to the second position.

In this or other embodiments, the first position and the second position are sequentially aligned with the center of a driving lane for vehicles.

In this or other embodiments, the driving lane is disposed at one of a border crossings, a freight inspection facility, a port freight pickup areas, a toll booth, and a highway entrance.

In this or other embodiments, the system further comprises a first signal device associated with the first position, the first signal device having a first stop indicator and a first go indicator. A second signal device is associated with the second position the second signal device having a second stop indicator and a second go indicator. The controller is further operably coupled to selectively activate the first signal device and second signal device.

In this or other embodiments, the controller de-energizes the first transmitting coil when the first go indicator is activated and energizes the second transmitting coil.

In this or other embodiments, the signal is transmitted by a vehicle moving in a direction of one of the first transmitting coil and second transmitting coil.

In this or other embodiments, the signal includes a vehicle identification number.

In this or other embodiments, the controller is configured to determine one or more of a year, country, a factory of manufacture; a make and model of the vehicle; a serial number of the vehicle, and information about an energy storage system of the vehicle.

In this or other embodiments, the information about the energy storage system includes at least one of a capacity size and voltage of installed battery pack(s), a target amount and maximum instantaneous charging current allowed for the vehicle, a "not to exceed" total charging current amounts per a given time-frame, a maximum charging acceptance rate that the vehicle can safely handle, and a maximum charging voltage the vehicle can accept.

In another embodiment, a vehicle charging system is provided. The system includes a first plurality of vehicle charging ground assemblies each having a first transmitting coil. Each of the transmitting coils is configured to move in a first direction and a second direction to change a position of an associated charging field. Each of the first transmitting coils of the first plurality of vehicle charging ground assemblies is spaced apart a first distance. The system includes a second plurality of vehicle charging ground assemblies each having a second transmitting coil. Each of the transmitting coils being configured to move in the first direction and the second direction to change a position of an associated charging field. Each of the second transmitting coils of the second plurality of vehicle charging ground assemblies is spaced apart a second distance. The system further includes a controller operably coupled to the first plurality of vehicle charging ground assemblies and the second plurality of vehicle charging ground assemblies to selectively energize the first transmitting coils and second transmitting coils in response to a first signal.

In this and other embodiments, the first plurality of vehicle charging ground assemblies are arranged in a serial manner in a first driving lane, and the second plurality of vehicle charging ground assemblies are arranged in a serial manner in a second driving lane.

In this and other embodiments the first distance is equal to the second distance.

In this and other embodiments, the second distance is larger than the first distance.

In this and other embodiments, the second distance is between 65-75 feet.

In this and other embodiments, the controller is configured to transmit a second signal indicating to a vehicle to move between one of the first transmitting coils to another of the first transmitting coils.

In this and other embodiments, the second signal is transmitted to a first signal device associated with the first plurality of vehicle charging ground assemblies.

In this and other embodiments, the second signal is transmitted to a vehicle.

In this and other embodiments, the controller is further configured to transmit the second signal based at least in part on a number of vehicles positioned within a predetermined distance of the first plurality of vehicle charging ground assemblies.

In another embodiment, another vehicle charging system is provided. The system including a first transmitting coil at a first position and configured to move a first charging field location in a first direction and a second direction. A second transmitting coil is positioned at a second position spaced apart from the first position. The second transmitting coil is configured to move a second charging field in the first direction and second direction. A first vehicle assembly is provided having first receiving coil coupled to a vehicle. The first vehicle assembly having a mechanism configured to change a vertical height of the first receiving coil. The first vehicle assembly also having a sensor configured to determine a distance from a surface of the first receiving coil to a top surface of the first transmitting coil or second transmitting coil. The system also having a first controller operably coupled to the first transmitting coil and the second transmitting coil. The controller being configured to selectively energize at least one of the first transmitting coil or the second transmitting coil in response to receiving a first signal. The controller being further operable to move a position of the at least one of the first charging field and the second charging field in response to the first signal.

In this and other embodiments, the vehicle includes a second controller operably coupled to the sensor and the first receiving coil, the controller being configured to activate the mechanism to change the vertical height of the first receiving coil from a third position to a fourth position based at least in part on receiving a signal from the sensor and the vehicle being in the first position.

In this and other embodiments, the second controller is further operable to activate the mechanism to change the vertical height of the first receiving coil from the fourth position to the third position in response to vehicle initiating movement from the first position to the second position.

In this and other embodiments, the first controller is further configured to energize the first transmitting coil in response to the vehicle moving towards the first position and receiving the first signal.

In this and other embodiments, the first signal is transmitted from the vehicle to the first controller.

In this and other embodiments, the first controller is further configured to transmit a second signal to the second controller.

In this and other embodiments, the second signal includes contextual information on the first transmitting coil.

In this and other embodiments, the contextual information includes information on a type of first transmitting coil and a location context information.

In this and other embodiments, the location contextual information includes at least one of that the charger is a public charger, that the charger is a private charger. that the charger is located outdoors, and that the charger is in an indoor parking space.

The term "about" is intended to include the degree of error associated with measurement of the particular quantity based upon the equipment available at the time of filing the application. For example, "about" can include a range of ±8% or 5%, or 2% of a given value.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection." It should also be noted that the terms "first", "second", "third", "upper", "lower", and the like may be used herein to modify various elements. These modifiers do not imply a spatial, sequential, or hierarchical order to the modified elements unless specifically stated.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A vehicle charging system having a ground assembly, the vehicle charging system comprising
    a first transmitting coil at a first position associated with a first stopping location of a vehicle, the first transmitting coil being configured to move a first charging field location in a first direction and a second direction;
    a second transmitting coil at a second position spaced apart from the first position, the second position being associated with a second stopping location of the vehicle, the second transmitting coil being configured to move a second charging field in the first direction and the second direction; and
    a controller operably coupled to the first transmitting coil and the second transmitting coil, the controller being configured to selectively energize at least one of the first transmitting coil or the second transmitting coil in response to receiving a signal, the controller being further operable to move a position of the at least one of the first charging field and the second charging field in response to the signal,
    wherein the controller is further configured to energize the first transmitting coil in response to a vehicle moving towards the first position,
    wherein the controller is further configured to energize the second transmitting coil in response to the vehicle moving from the first position to the second position,
    wherein the first position and the second position are sequentially aligned with a center of a driving lane for vehicles,
    a first signal device associated with the first position, the first signal device having a first stop indicator and a first go indicator;
    a second signal device associated with the second position the second signal device having a second stop indicator and a second go indicator; and
    wherein the controller is operably coupled to selectively activate the first signal device and the second signal device.

2. The system of claim 1, wherein the driving lane is disposed at one of a border crossings, a freight inspection facility, a port freight pickup areas, a toll booth, and a highway entrance.

3. The system of claim 1, wherein the controller de-energizes the first transmitting coil when the first go indicator is activated and energizes the second transmitting coil.

4. The system of claim 1, wherein the signal is transmitted by a vehicle moving in a direction of one of the first transmitting coil and the second transmitting coil.

5. The system of claim 4, wherein the signal includes a vehicle identification number.

6. The system of claim 5, wherein the controller is configured to determine one or more of a year, country, a factory of manufacture; a make and model of the vehicle; a serial number of the vehicle, and information about an energy storage system of the vehicle.

7. The system of claim 6, wherein the information about the energy storage system includes at least one of a capacity size and voltage of installed battery pack(s), a target amount and maximum instantaneous charging current allowed for the vehicle, a "not to exceed" total charging current amounts per a given time-frame, a maximum charging acceptance rate that the vehicle can safely handle, and a maximum charging voltage the vehicle can accept.

8. A vehicle charging system having a ground assembly, the vehicle charging system comprising:
    a first transmitting coil at a first position and configured to move a first charging field location in a first direction and a second direction;
    a second transmitting coil at a second position spaced apart from the first position, the second transmitting coil being configured to move a second charging field in the first direction and the second direction;
    a controller operably coupled to the first transmitting coil and the second transmitting coil, the controller being configured to selectively energize at least one of the first transmitting coil or the second transmitting coil in response to receiving a signal, the controller being further operable to move a position of the at least one of the first charging field and the second charging field in response to the signal;
    a first signal device associated with the first position, the first signal device having a first stop indicator and a first go indicator; and
    a second signal device associated with the second position the second signal device having a second stop indicator and a second go indicator, wherein the controller is operable to selectively activate the first signal device and the second signal device.

* * * * *